(12) United States Patent
Fruth

(10) Patent No.: US 8,956,692 B2
(45) Date of Patent: Feb. 17, 2015

(54) DEVICE AND METHOD FOR MANUFACTURING A THREE-DIMENSIONAL BODY

(75) Inventor: Carl Fruth, Parsberg (DE)

(73) Assignee: Fit AG, Parsberg (DE)

( * ) Notice: Subject to any disclaimer, the term of this patent is extended or adjusted under 35 U.S.C. 154(b) by 120 days.

(21) Appl. No.: 13/508,679

(22) PCT Filed: Nov. 4, 2010

(86) PCT No.: PCT/EP2010/006706
§ 371 (c)(1),
(2), (4) Date: May 8, 2012

(87) PCT Pub. No.: WO2011/054505
PCT Pub. Date: May 12, 2011

(65) Prior Publication Data
US 2012/0225210 A1 Sep. 6, 2012

(30) Foreign Application Priority Data

Nov. 8, 2009 (DE) .......................... 10 2009 053 190

(51) Int. Cl.
*B29C 67/00* (2006.01)

(52) U.S. Cl.
CPC .................................. *B29C 67/0077* (2013.01)
USPC ........................................................ 427/180

(58) Field of Classification Search
CPC ................................................... B29C 67/0077
USPC ......................................... 427/497, 308, 113
See application file for complete search history.

(56) References Cited

U.S. PATENT DOCUMENTS

| 2006/0105102 A1 | 5/2006 | Hochsmann et al. |
| 2007/0145629 A1 | 6/2007 | Ebert et al. |
| 2009/0011066 A1 | 1/2009 | Davidson et al. |
| 2011/0156300 A1 | 6/2011 | Fruth |

FOREIGN PATENT DOCUMENTS

| DE | 10 2008 022 946 A1 | 11/2009 |
| EP | 1 597 003 B1 | 4/2010 |
| WO | 03/086726 A1 | 10/2003 |
| WO | 2008/028443 A2 | 3/2008 |
| WO | WO 2008028443 A2 * | 3/2008 |
| WO | WO 2008028443 A3 * | 8/2008 |

OTHER PUBLICATIONS

Gerbhardt, Andreas; "Generative Fertigungsverfahren" [Rapid Prototyping—Rapid Tooling—Rapid Manufacturing], 3rd Edition Muenchen: Carl Hanser Verlag, 2007, p. 94, ISBN 978-3-446-22666-1—Statement of Relevance.

* cited by examiner

*Primary Examiner* — Dah-Wei D Yuan
*Assistant Examiner* — Nga Leung V Law
(74) *Attorney, Agent, or Firm* — Laurence A. Greenberg; Werner H. Stemer; Ralph E. Locher

(57) ABSTRACT

The production of three-dimensional bodies is performed by selective solidification, wherein surface impurities on the layers to be produced, which may occur during the production process using "powder shuttle" technology, are significantly reduced or eliminated. In this manner the production process is more efficient, produces a higher grade product and is more economical to implement.

2 Claims, 5 Drawing Sheets

DEVICE AND METHOD FOR MANUFACTURING A THREE-DIMENSIONAL BODY

BACKGROUND OF THE INVENTION

Field of the Invention

The invention relates to an apparatus and a method for manufacturing a three-dimensional object by selective solidification of a build material applied in layers.

The invention relates in particular to a method for manufacturing a three-dimensional object by selective solidification of a build material applied in layers, in which build material is applied with the aid of an application device onto a substrate or an already solidified layer of the object to be manufactured, the application device including a movably mounted reservoir container for the reception of build material, which reservoir container is, for application of a layer, transferred from a waiting position into an application position and, before solidification of the layer, from the application position back into the waiting position, and the reservoir container comprising a separating element that is mounted movably, in particular shiftably, with respect to container walls and in the application position extends substantially parallel to the layer to be generated, displacement of which separating element causes a part of the reservoir container, said reservoir container being arranged in the application position, firstly to be opened for the application of build material and then to be closed again for manufacture of the layer to be solidified, by partial removal of the applied, not yet solidified build material.

The invention further relates in particular to an apparatus for manufacturing a three-dimensional object by selective solidification of a build material applied in layers, having an application device with the aid of which build material is applied onto a substrate or an already solidified layer of the object to be manufactured, the application device including a movably mounted reservoir container for the reception of build material, which reservoir container is, for application of a layer, transferable from a waiting position into an application position and, before solidification of the layer, from the application position back into the waiting position, and the reservoir container comprising a separating element that is mounted movably, in particular shiftably, with respect to container walls and in the application position extends substantially parallel to the layer to be generated, displacement of which separating element causes a part of the reservoir container, reservoir container being arranged in the application position, firstly to be opened for the application of build material and then to be closed again for manufacture of the layer to be solidified, by partial removal of the applied, not yet solidified build material.

Methods for manufacturing three-dimensional objects by selective solidification of a build material are known in large numbers from the existing art. Mention may be made here, for example, of laser sintering or selective mask sintering. In these methods, three-dimensional objects are manufactured directly from CAD data with the aid of an additive fabrication method. Construction of the object occurs in this context in layers, by the fact that layers of a build material are applied successively onto one another. Before application of the respective subsequent layers, the locations in the respective layers corresponding to the object to be fabricated are selectively solidified. Solidification is accomplished by local heating, with the aid of a radiation source, of the usually powdered layering raw material. By targeted introduction of radiation in suitable fashion into the desired region, an exactly defined object structure of any kind can be generated. Such methods are usable in particular for the manufacture of three-dimensional objects by successively generating multiple thin, individually configured layers.

Materials that are utilized in such layer manufacturing methods are, for example, resins, plastics, metals, or ceramics. Units with which a layer manufacturing method of this kind is carried out are also referred to as layer manufacturing units or rapid prototyping systems.

In a novel layer manufacturing method such as the one described in German Patent Application DE 10 2008 022 946, it is proposed that the build material not be applied, as previously generally usual, by way of a horizontal movement of an application element (doctor, blade, roller, etc.). Instead, what is proposed in order to bring about "non-contact" material application is the use of a reservoir container for the reception of build material, out of which build material is applied in a first layer thickness onto a substrate or an already solidified layer of the object to be manufactured. A portion of the applied, not yet solidified build material is then removed again so that a defined layer of unsolidified build material remains, which layer has, at least in predetermined regions, a second layer thickness that is less than the originally applied first layer thickness. The build material is thus first applied "thickly," and is then removed again so as to generate the desired layer thickness, the removal occurring in such a way that shear or thrust forces that might act on the remaining layer of not yet solidified build material are avoided or in any case greatly reduced. A separating element that comprises a separating edge extending parallel to the surface of the layer to be produced is used for this purpose, the separating element being moved horizontally in the build material in order to remove that portion of the applied material which is not needed. In summary, the technology described therein therefore relates to the application of build material in a manner free of transverse forces, by the use of "loose feeding" rather than doctor blade application or the like. Because of the back-and-forth movement of the reservoir container, this technology is also referred to as "powder shuttle" technology.

The reservoir container out of which the build material is applied must be transferred from its application position into a waiting position for solidification of the layer being generated. Removal of the reservoir container from the application position exposes the layer to be solidified. In other words, space is created for the radiation, deriving from a radiation source, that is introduced into the layer to be solidified.

The horizontal removal of the reservoir container from its application position into the waiting position, however, causes turbulence of the gas molecules at the surface of the layer to be solidified. The resulting suction causes the formation of very fine surface disruptions, in particular of so-called "ripples." These disruptions occur in particular when fine or ultrafine powders are used as build material. This is disadvantageous in particular because the reservoir container must be moved particularly slowly in order to avoid such disruptions, resulting in long production times for the individual layers.

BRIEF SUMMARY OF THE INVENTION

An object of the present invention is therefore to improve the technology for manufacturing three-dimensional objects by selective solidification in such a way that when powder shuttle technology is used, no surface disruptions occur on the layer to be generated, or such disruptions are at least greatly reduced. It is an object of the invention in particular to greatly reduce process times, and in particular coating times, in the context of powder shuttle technology.

This object is achieved by the respective apparatuses and methods described in the Claims. Advantageous embodiments of the invention are described in the dependent claims. The advantages and configurations explained below in conjunction with the methods according to the present invention also apply mutatis mutandis to the apparatuses according to the present invention, and vice versa.

A first method according to the present invention is notable for the fact that transfer of the reservoir container from the application position into the waiting position includes a lifting of the reservoir container away from the layer to be solidified, and/or that transfer of the reservoir container from the waiting position into the application position includes a lowering of the reservoir container.

This inventive idea is based on the realization that a displacement of the reservoir container relative to a layer to be solidified (or vice versa) in an exclusively horizontal direction, as described in DE 2008 022 946, results in an air flow over the surface and, associated therewith, in turbulence above the layer to be solidified, which is responsible for the creation of surface disruptions, in particular of so-called "ripples." If, on the other hand, the reservoir container is raised during transfer into the waiting position, in particular before a horizontal displacement of the reservoir container, the turbulence at the surface of the layer is thus reduced.

The effect described can be achieved correspondingly if, instead of a raising of the reservoir container, a lowering of the layer to be solidified occurs. What is essential is the creation of an air space between the reservoir container and layer during, but in particular after, the usually horizontal movement of the reservoir container away from the layer into the waiting position.

It is particularly advantageous if the reservoir container is raised and lowered inhomogeneously, so that it is tilted with respect to the layer to be generated, i.e. the reservoir container is oriented obliquely when it is moved away from the layer to be generated, or toward the layer. In other words, what is important is that the spacing between the reservoir container on the one hand and the layer on the other hand be modified inhomogeneously. In this case the turbulence still present at the layer surface even in the case of parallel lifting, as a result of the suction effect, is further considerably reduced. This is attributable to the fact that as a result of the tilting, or the creation of an inhomogeneous spacing, a relatively large opening is produced comparatively quickly between the underside of the reservoir container on the one hand and the layer on the other hand, so that the flow velocity of the gas molecules in the gap between the underside of the reservoir container on the one hand and the layer on the other hand, and in particular directly above the layer to be generated, is comparatively small, whereas in the case of a horizontal displacement of an untilted reservoir container, high flow velocities occur in the comparatively small gap between the underside of the reservoir container on the one hand and the layer on the other hand, if such a gap is present at all.

Tilting of the reservoir container represents a particularly uncomplicated approach to rapidly creating an air space between the reservoir container and layer. The air space is generated much faster as compared with parallel lifting of the reservoir container. The result is that this enables particularly rapid, in particular horizontal displacement of the reservoir container.

Once solidification of the layer has occurred, the reservoir container is brought back into the application position for application of a new layer. The description above applies correspondingly in this case. The reservoir is preferably brought in an oblique posture to its target position at the layer to be produced (the application position), and is then tilted back into a substantially horizontal posture. Here as well, the comparatively large opening between the underside of the reservoir container on the one hand and the layer on the other hand reduces the formation of turbulence and surface damage. Once the reservoir container has been straightened and the bottom element has been removed, application of the powder by loose feeding once again occurs, as well as removal of the excess build material by the separating element.

Based on the aforementioned realization, a first basic concept of the invention is therefore to reduce the gas movements that can be caused by a displacement of the reservoir container and, especially with fine and ultrafine powders, can result in turbulence at the surface of the layer to be generated, by minimizing the velocity of the gas flowing between the underside of the reservoir container on the one hand and the layer on the other hand, and in particular at the surface of the layer. The actions proposed make possible displacement speeds of the reservoir container from more than 500 mm/s to 2000 mm/s, so that coating times in the context of powder shuttle technology can be appreciably reduced.

A second inventive idea is described below.

Based on the aforementioned realization, a further basic concept of the invention, with the goal of decreasing coating times, is to decrease gas movement by reducing the quantity of gas that is flowing. For this, it is proposed according to the present invention to carry out the method in a vacuum environment.

A further method according to the present invention is therefore notable for the fact that movement of the reservoir container from the application position into the waiting position and/or from the waiting position into the application position, and/or displacement of the separating element for opening and/or closing the reservoir container, brings about a gas flow moving along the surface of the layer to be solidified or along the surface of the layer already solidified; and that the method proceeds under vacuum in order to reduce the quantity of gas flowing along the surface of the layer to be solidified or along the surface of the layer already solidified, with the goal of reducing gas movements that can result in turbulence at the layer surface and thus in surface disruptions.

The use of vacuum in layer manufacturing methods is in principle already known. Hitherto, however, vacuum has been used only as an alternative to the use of inert gas, with which the process space is continually flushed in order, in particular, to suppress oxidation processes that proceed during sintering in the presence of external air. The present invention proposes for the first time to use vacuum in order to reduce the quantity of gas flowing at the surface of the layer to be generated, in order to decrease gas movements that can result in turbulence at the layer surface and thus in surface disruptions.

Execution of the method in a "process space that is under vacuum" means, for purposes of the invention, that a particularly low pressure exists at least in the build chamber in which the object is produced, but preferably also in the displacement region of the reservoir container. The absolute pressure is preferably equal to less than 100 mbar. It is particularly advantageous to carry out the layer manufacturing method in a process space at absolute pressures below 30 mbar. A preferred working pressure range is between 30 mbar and 0.5 mbar.

A third inventive idea is described below.

As already indicated in DE 10 2008 022 946, the reservoir container can be embodied to be open. Especially when powdered build material is used, however, it is advantageous to use a closed reservoir container, since undesired emergence, in particular sloshing out, of build material from the reservoir container, and thus undesired contamination of the process environment, can thereby be avoided. A further inventive idea is thus based on the realization that when a closed reservoir container is used, closing of the reservoir container as a result of displacement of the separating element for removal of the build material brings about a pressure increase in the interior of the reservoir container. This overpressure is caused by the separating element displacing build material during the closing operation. If the reservoir container is a closed one, the overpressure would move the build material along under the blade of the separating element and over the surface, which in turn would result in surface disruptions. Particularly large surface disruptions would result when the turbulence of the gas molecules at the layer surface is particularly severe due to a high displacement speed of the separating element.

Process times can be further shortened by a particularly fast displacement of the separating element if, according to a third method according to the present invention, the pressure increase that occurs in the interior of the reservoir container is equalized. Displacement speeds of the separating element of over 250 mm/s thereby become possible.

The pressure equalization can be accomplished, for example, by the use of active elements, for example by aspiration or the like.

Pressure equalization becomes possible in particular simple fashion if the equalization volume is made available by the surroundings of the reservoir container to which the reservoir container is connected through an equalization opening. According to the present invention, the equalization opening is arranged in the reservoir container in such a way that an escape of build material through the equalization opening is precluded. In particular, the equalization opening is provided in such a way that upon a movement of the reservoir container, in particular upon displacement from the application position into the waiting position and back, sloshing of the build material in the reservoir container, and in particular emergence, associated therewith, of build material from the equalization opening, is avoided. The equalization opening is preferably embodied in such a way that further elements for preventing an undesired emergence of build material, for example slosh baffles or the like, can be omitted.

To achieve this, it is proposed in particular that the opening be embodied as a funnel, extending over the entire width of the reservoir container and preferably arranged perpendicular to the movement direction of the reservoir container, that on the one hand has a sufficient height and on the other hand comprises a constriction through which only a small quantity of build material can slosh back when the reservoir container decelerates upon reaching the waiting position.

A further advantage of a closed reservoir container having an equalization opening, as compared with an open reservoir container, is that the opening reservoir container would need to be made appreciably larger, in particular would need to have appreciably higher side walls, in order reliably to preclude undesired emergence of build material. The reservoir container according to the present invention, on the other hand, can be made much more compact and thus also lighter, thereby enabling very fast back-and-forth movements of the reservoir container.

In a further embodiment of the invention, provision is made that the equalization opening is opened only as required. The risk of an unintentional escape of build material from the reservoir container is thereby further minimized.

It is of course possible to combine the inventive ideas described above with reference to the various methods with one another in order to enhance the effects achieved by the individual methods. It is likewise possible to combine the devices embodied for executing the above-described methods with one another, and to use them in a single layer manufacturing unit.

Apparatuses according to the present invention for carrying out the methods described above are likewise indicated in the Claims. The apparatuses according to the present invention that are indicated can moreover include further devices necessary and/or useful for manufacturing a three-dimensional object, in particular those devices indicated in DE 10 2008 022 946. Also possible, however, is the use of devices deviating therefrom, provided the basic principle of powder shuttle technology is thereby implemented.

Exemplifying embodiments of the invention are described in further detail below with reference to the drawings, in which:

DESCRIPTION OF THE INVENTION

Figure 1A:
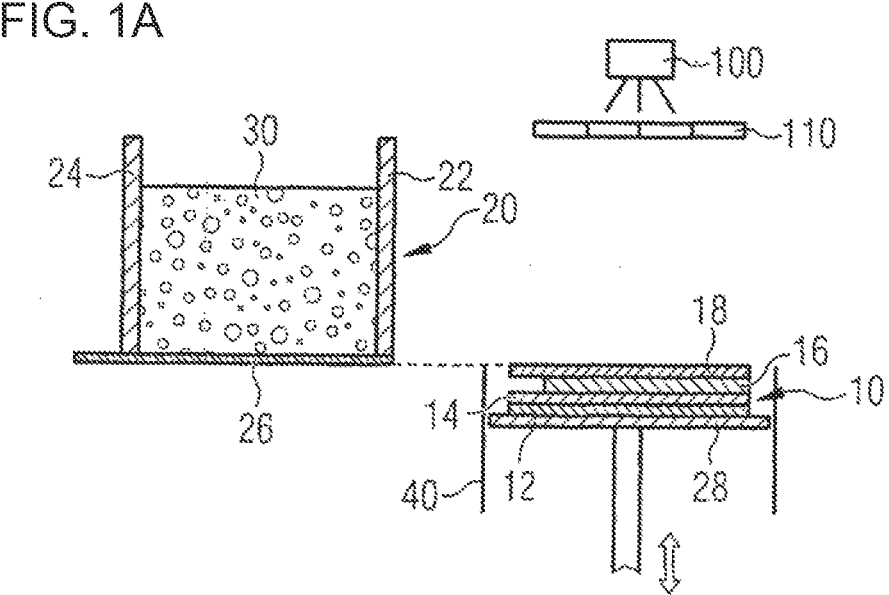
FIG. 1 shows a sequence of method steps in accordance with the existing art described in DE 10 2008 022 946.

All the Figures show the invention merely schematically and with its essential constituents. Identical reference characters refer, in this context, to elements of identical or comparable function.

FIGS. 1a) to 1g) depict, in various method phases, the method described in DE 10 2008 022 946 for manufacturing a three-dimensional object 10. The build material used here is a plastic powder, for example polyamide, although for example a metal or ceramic powder, or corresponding fibers or pastes, can also be used.

As FIG. 1a) shows, object 10 is already made up of several superimposed solidified or hardened layers 12, 14, 16, 18. A powdered coating material 30 has been hardened, solidified, melted, or fused in predetermined regions in a manner commonly known from the existing art. As a result, each layer 12, 14, 16, 18 has the desired contour of object 10 that is to be manufactured.

A container 20 is shown schematically in FIG. 1a) in vertical section. Container 20 is embodied here as a reservoir container in which the loose powder 30 is stocked. Container 20 comprises walls 22, 24 that, together with a bottom 26, constitute container 20. Container walls 22, 24, together with further container walls (not depicted here) and bottom 26, constitute an open reservoir space in which powder 30 for processing is stored.

Object 10 that is to be manufactured rests on a vertically movable carrier plate 28 that is movable upward and downward via means not depicted here. Located above object 10, which here is partly produced, is a radiation source 100 that can include, for example, an array of a plurality of infrared radiators. As an alternative to this it is also possible to provide, as a radiation source, a laser beam that is to be directed.

In the context of the arrangement shown here by way of example, a mask 110, which can be created for example by printing onto a glass plate, is located below radiation source 100. On this mask 110, the regions of a new layer 50 that is to be produced are left open, and the other regions of the glass plate are embodied to be substantially impenetrable to the electromagnetic radiation of radiation source 100, for example are blacked out. This configuration thus shows a configuration in which the so-called selective mask sintering (SMS) method is utilized, in which, instead of a laser beam, a wide-area radiation source such as, for example, an array of infrared radiators is used to harden or solidify defined layer regions. The definition as to which regions of a layer are to be hardened or solidified occurs by way of a mask that must be generated anew for each layer.

In addition, carrier plate 28 together with lateral walls constitutes here a collection container 40 in which unhardened coating material remains above carrier plate 28. The walls can be arranged in stationary fashion with regard to carrier plate 28.

Figure 1B:
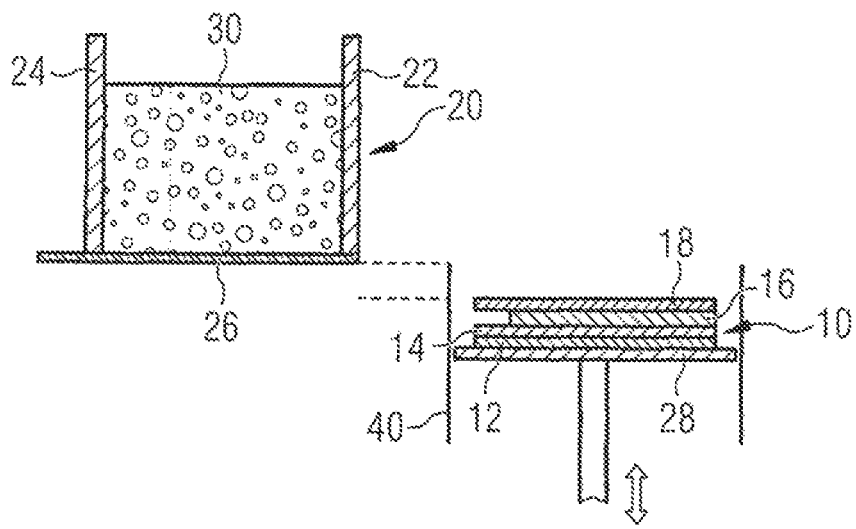

It is evident from the following sequences in accordance with FIGS. 1b) to 1g) that container 20 is mounted movably; in particular, it is movable horizontally in the views depicted in accordance with FIG. 1. In addition, container bottom 26 is mounted shiftably with respect to walls 22, 24.

According to the view in accordance with FIG. 1a), layer 18 of object 10 that is to be manufactured has been hardened or solidified by means of the known technologies. To manufacture a new layer 50, carrier plate 28, along with layers 14, 16, 18 that have already been produced and hardened, is displaced a specific travel distance downward. This step is depicted in FIG. 1b).

Figure 1C:
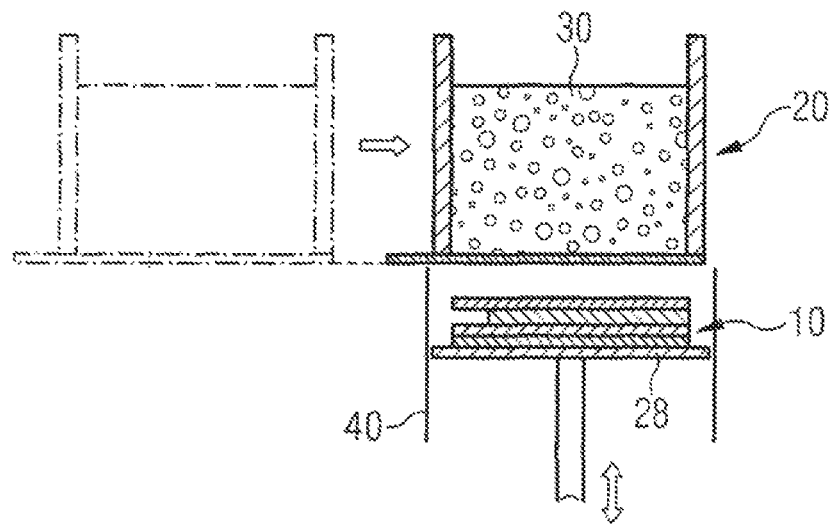
Figure 1D:
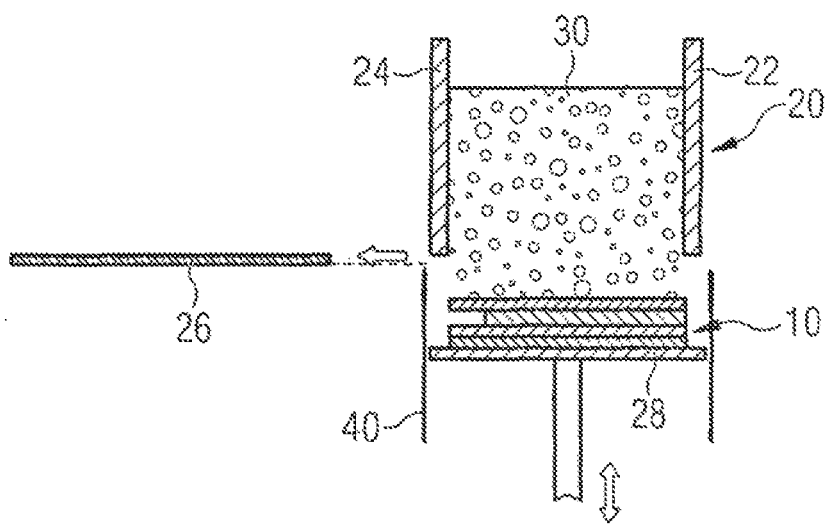
Figure 1E:
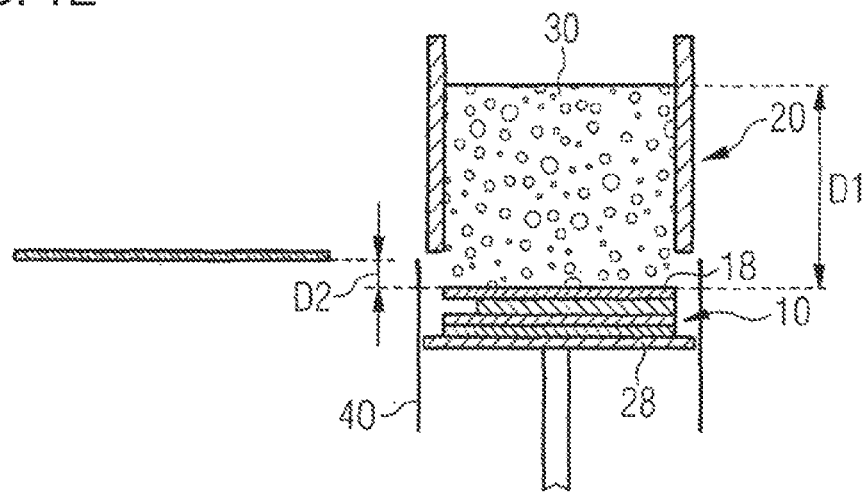

As FIG. 1c) shows, container 20 is now displaced above layer 18 that was most recently produced. Container bottom 26 is then (as depicted in FIG. 1d)) pulled out to the left in the view shown; powder 30 in container 20 slides downward and covers the most recently produced layer 18. This method phase is also shown in further detail in FIG. 1e). The pulling away or sliding out of container bottom 26 thus results in a layer 50 of loose material having a large thickness D1 that is higher or thicker than the layer thickness D2 that is actually to be produced.

Figure 1F:
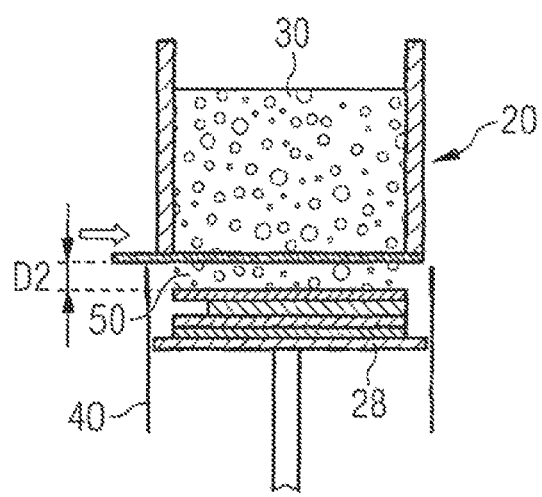

Bottom panel 26 is then moved inward in the step in accordance with FIG. 1f), resulting in layer thickness D2. D2 is the final layer thickness if no further compression or densification takes place after separating element 26 is moved in. In other words, the result of the method sequence depicted by way of example in FIG. 1 is firstly to form, on the most recently prepared layer 18, a layer of material 30 to be solidified which has a greater layer height or layer thickness than what is then desired later as final layer thickness D2. The movement of bottom 26 back in under container 20 results in layer thickness D2 of the new layer 50 to be manufactured. This is particularly apparent in FIG. 1f).

Figure 1G:
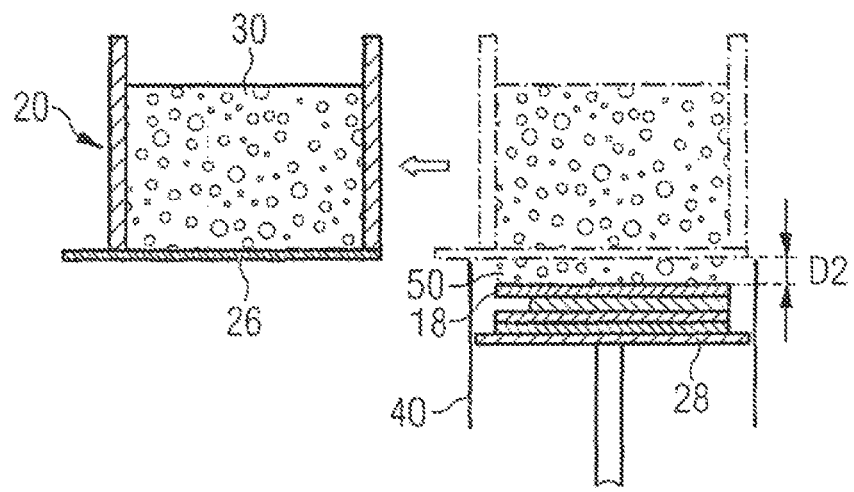

In the step in accordance with FIG. 1g), container 20, with separating element 26 moved back in, is then moved back into the initial position on the left. Afterwards, the outward movement of container 20 together with bottom panel 26 (which functions here as a separating element) then causes formation of the new layer 50, with the desired layer thickness D2, on the most recently solidified layer 18. The desired selective solidification or hardening of the loose coating material 30 of layer 50 can now be carried out by means of the aforementioned radiation source 100. Further layers of object 10 to be formed can then be generated with a new sequence of the method steps in accordance with FIGS. 1a) to 1g).

A possible alternative embodiment can also provide a further step in which, between the step in accordance with FIG. 1f) and the step in accordance with FIG. 1g), carrier plate 28 is displaced slightly upward, with the result that layer 50 that has been produced is compressed, since bottom 26 is of course still located above layer 50. Alternatively, container 20 can be displaced a defined travel distance downward in order thereby to compress layer 50 to the predefined final layer thickness D2.

It is only after the optional compression step that container 20 is then moved back again as depicted in FIG. 1g). This possible special case of an exemplifying embodiment according to the present invention of a method for manufacturing a three-dimensional object 10 can be advantageous for certain materials, in particular in order to achieve a greater density in layer 50 that is to be produced.

The methods explained above for manufacturing a three-dimensional object 10 from multiple layers 12, 14, 16, 18 have in common the fact that for the first time, in the context of production of the final layer thickness D2 of layer 50 that is to be manufactured, the forces acting in this context on layer 50 to be produced—and on layer 18 located therebeneath, as well as possibly on further layers 12, 14, 16—are smaller than previously, and the problems that occur in some circumstances can thus in some circumstances be avoided.

Figure 2:
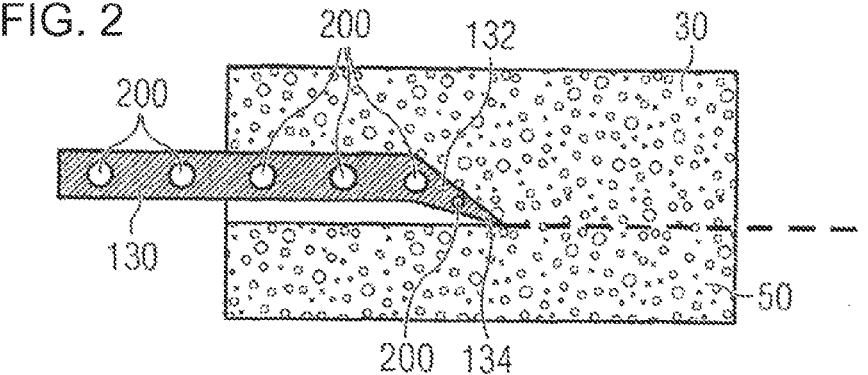
FIG. 2 shows a separating element in accordance with the existing art described in DE 10 2008 022 946.

FIG. 2 shows a detail of possible separating devices, here a plate 130. Separating element 130 here has front edge 132 that tapers specifically into an extremely thin cutting edge 134 so that separation of material 30 can occur without difficulty, and the new layer 50 to be produced can be created at a defined layer thickness D2. In this example of an embodiment of plate 130, cutting edge 134 has an undercut so that directly behind cutting edge 134, the material of the new layer 50 no longer slides along plate 130 or front edge 132, thus avoiding detachment problems that occur in some circumstances.

It is to be noted that in an example of an embodiment, cooling elements such as, for example, cooling conduits 200 are present in separating element 130 and/or cutting edge 134 in order to allow implementation of suitable cooling of a layer 50 to be solidified. In this case, for example, cooling conduits 200 are embodied in serpentine fashion in separating element 130, through which conduits a cooling medium such as, for example, water or other fluids flow. Cooling conduits 200 are incorporated into a cooling circuit (not shown) having corresponding elements.

Alternatively, a corresponding configuration can also be provided for uniform heating of separating element 130 and/or of cutting edge 134. A combination of cooling and heating elements 200 in separating element 130 is also conceivable. For example, either a cooling or a heating fluid could be pumped for this purpose through conduits 200.

The method depicted in FIG. 1 for manufacturing a three-dimensional object 10 from individual solidified layers 12, 14, 16, 18 which are generated from a coating material 30 such as powder, or from fluid materials, is notable for the following method steps:
- applying a coating material 30 to be solidified, at a first layer thickness D1, onto a substrate or an already solidified layer 18 of object 10 to be manufactured,
- removing a portion of the applied, not yet solidified coating material 30 so that a new layer 50 of unsolidified coating material 30 remains, which layer has, at least in predetermined regions, a second layer thickness D2 that is less than first layer thickness D1, and solidifying the remaining coating material 20 of the new layer 50 at predetermined locations in order to generate a desired layer contour of the three-dimensional object 10.

The method according to the present invention is preferably furthermore notable for the fact that in the context of the step of taking away a portion of the applied, not yet solidified coating material 30 that is located above second layer thickness D2, it is separated, in particular isolated, from coating material 30 located below second layer thickness D2.

The method is preferably furthermore notable for the fact that the taking away of coating material 30 includes a displacement of a separating element 26 extending substantially parallel to the new layer 50 that is to be generated.

The method is preferably furthermore notable for the fact that, simultaneously with the step of taking away coating material 30, the coating material 30 taken away is conveyed into a reservoir container 20 for coating material 30.

The method is preferably furthermore notable for the fact that the application of coating material 30 at first layer thickness D1, and the taking away of coating material 30 to generate a new layer 50 of coating material 30 having second layer thickness D2, is carried out in separate passes, or else, alternatively thereto, in one pass.

The method is preferably furthermore notable for the fact that the application of coating material 30 occurs at a first layer thickness D1 which is approximately 1.2 to 5000, in particular approximately 10 to 1000 times as thick as the final defined layer thickness D2 of the new layer 50 of coating material 30 to be solidified.

The method is preferably furthermore notable for the fact that the application of coating material 30 at first layer thickness D1 occurs with the aid of a shiftably mounted bottom element 26 of a reservoir container 20 having coating material 30 located therein.

The method is preferably furthermore notable for the fact that the application of coating material 30 at first layer thickness D1 occurs as a result of displacement of a movably mounted bottom element 26 of a reservoir container 20 having coating material 30 located therein, so that coating material 30 follows an already solidified layer 18.

The method is preferably furthermore notable for the fact that different layers 12, 14, 16, 18, 50 of object 10 are created from differing coating materials 30.

The method is preferably furthermore notable for the fact that coating material 30 is compressed before solidification of the remaining coating material 30.

The method is preferably furthermore notable for the fact that the step of compressing the remaining coating material 30 occurs by contact pressure of a shaping element 26, 130, or by raising the already manufactured part of object 10, along with the defined layer 50 located thereon made of unsolidified coating material 30, against a shaping element 26, 130.

The method is preferably furthermore notable for the fact that prior to solidification of the remaining coating material 30, the coating material is compressed by the front edge of shaping element 26, 130.

The method is preferably furthermore notable for the fact that coating material 30 applied at the desired layer thickness is heated or cooled, in particular is heated up by a shaping element 26, 130.

The method is preferably furthermore notable for the fact that the operation of taking away is carried out by means of a vibrating shaping element 26, 130.

The apparatus depicted in FIG. 1 for manufacturing a three-dimensional object 10 from individual solidified layers 12, 14, 16, 18, 50 of a coating material 30, such as powder or fluid material, includes an application device 20 which is embodied to apply a coating material 30 at a first layer thickness D1 onto a substrate 28 or an already solidified layer 18 of object 10 to be manufactured, a reducing device 26, 130 which is embodied to remove a portion of the applied, not yet solidified coating material 30 in such a way that a defined layer 50 of unsolidified coating material 30 remains, which layer has, at least in predetermined regions, a defined second layer thickness D2 which is less than first layer thickness D1, and a solidification device 100 which is embodied to solidify the remaining coating material 30 at predetermined locations in order to generate a desired layer contour of the three-dimensional object 10.

The apparatus is preferably furthermore notable for the fact that the application device and the reducing device are integrated into a movable, in particular shiftably mounted, application and reduction unit.

The apparatus is preferably furthermore notable for the fact that multiple application devices 20 and/or reducing devices 26, 130 are present.

The apparatus is preferably furthermore notable for the fact that the application apparatus includes a movable, in particular shiftably mounted, reservoir container 20 for the reception of coating material 30, such that the reservoir contained can in particular also be closed.

The apparatus is preferably furthermore notable for the fact that reservoir container 20 for the reception of coating material 30 includes a separating element 26 mounted movably, in particular substantially horizontally shiftably, with respect to container walls 22, 24, separating element 26 being embodied for example, on the outer surface facing toward layer 50 to be produced, as shaping element 26.

The apparatus is preferably furthermore notable for the fact that the reducing device is a movable planar separating element 26 that comprises a narrow separating edge 134.

The apparatus is preferably furthermore notable for the fact that reducing device 26, 130 is movable horizontally and/or perpendicularly to the upper side of layer 50 that is to be manufactured.

The apparatus is preferably furthermore notable for the fact that a carrier device 28 is present on which object 10 to be manufactured is produced, carrier device 28 preferably being movable substantially vertically.

The apparatus is preferably furthermore notable for the fact that multiple application devices 20 and/or reducing devices 26, 130 are arranged around carrier device 28.

The apparatus is preferably furthermore notable for the fact that reducing device 26, 130 is heatable and/or coolable and/or can be caused to vibrate.

The above-described apparatus and above-described method in accordance with DE 10 2008 022 946 serves as the basis for the invention explained below. In other words, the apparatus according to the present invention includes some or all of the described components of the above-described apparatus, and the method according to the present invention includes some or all of the above-described method steps.

Figure 3:
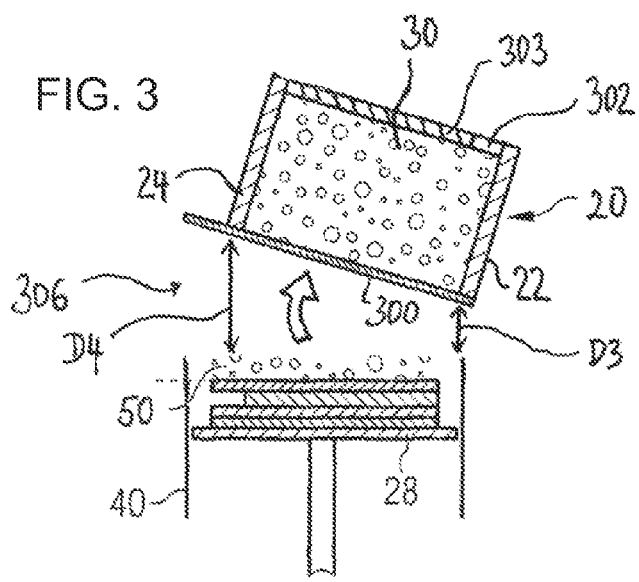
FIG. 3 shows a method step in accordance with the present invention.

In an embodiment of the invention a substantially closed reservoir container 20 is used, which in a first sub-step is tilted in the application position, with the aid of a, for example, hydraulically actuable tilting device (not further depicted), in such a way that the spacing between underside 300 of reservoir container 20 on the one hand, and layer 50 to be solidified on the other hand, changes inhomogeneously. In other words, reservoir container 20 is raised obliquely. FIG. 3 shows reservoir container 20 at the end of the first sub-step which is adjacent, considered in terms of time, to the closing (depicted in FIG. 1*f*)) of reservoir container 20.

In the embodiment illustrated, reservoir container 20 is tilted in such a way that a large opening 306 occurs comparatively quickly between underside 300 of reservoir container 20 on the one hand and layer 50 on the other hand, such that side wall 22 of reservoir container 20 which is at the front (viewed in movement direction 304) upon movement of reservoir container 20 from the application position into the waiting position is raised less than the oppositely located side wall 24. In other words, upon tilting a first spacing D3 is created between underside 300 of reservoir container 20 and layer 50 in the region of side wall 22, and a second, larger spacing D4 is created in the region of the oppositely located side wall 24, so that reservoir container 20 as a whole is lifted away from layer 50 to be solidified, and underside 300 of reservoir 20 is arranged in non-parallel fashion with respect to layer 50.

Figure 4:
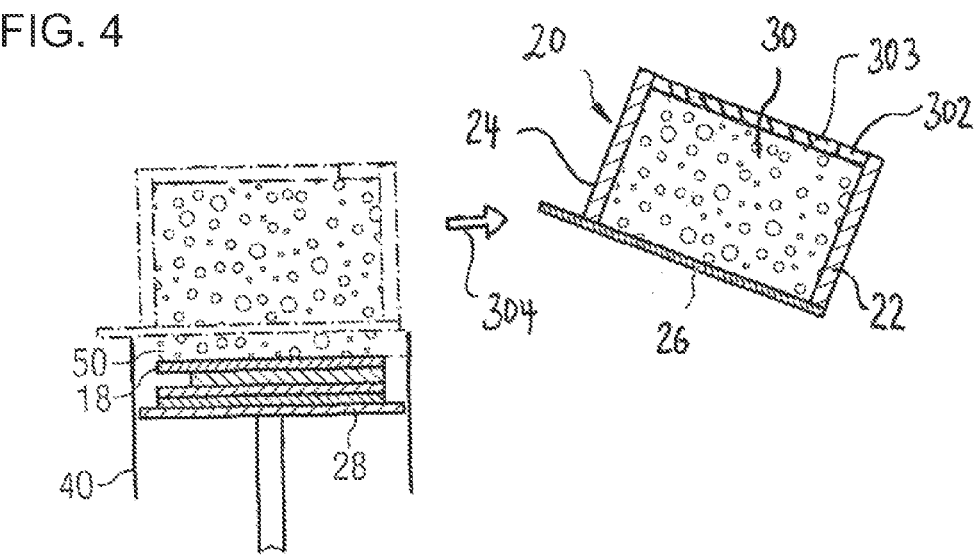
FIG. 4 shows a further method step in accordance with the present invention.

In a second sub-step, reservoir container 20 is then displaced horizontally in movement direction 304 into the starting position (waiting position), where it remains preferably in a tilted posture until it is again moved into the application position above object 10 to be produced, and is once again tilted into the horizontal position. FIG. 4 shows the arrangement of reservoir container 20 in the waiting position, and thus corresponds to FIG. 1*g*).

The reservoir container comprises an equalization opening 302, depicted only schematically in FIGS. 3 and 4, that connects reservoir container 20 to the process environment. Equalization opening 302 is embodied in such a way that the emergence of build material 30 from equalization opening 302 is prevented.

Figure 5A:
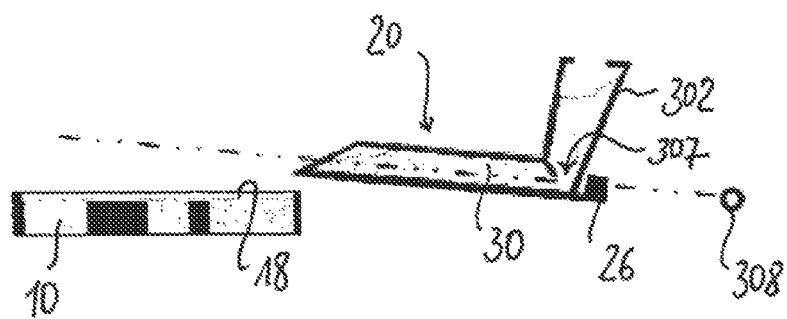
FIG. 5 shows a sequence of method steps in accordance with the present invention.
Figure 5B:
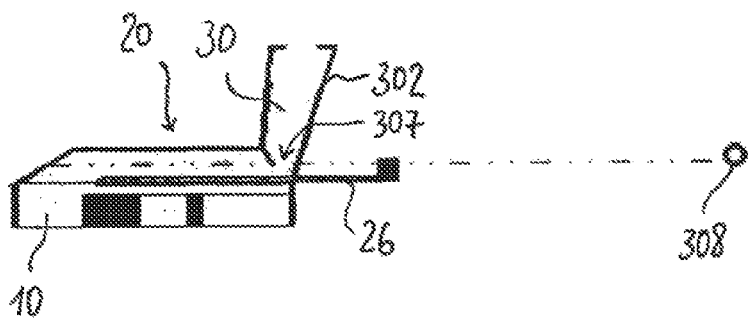
Figure 5C:
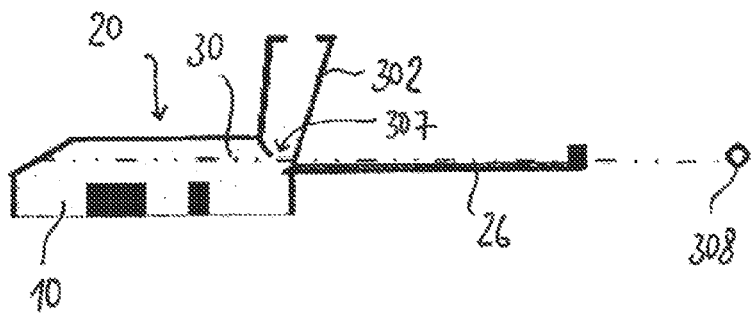
Figure 5D:
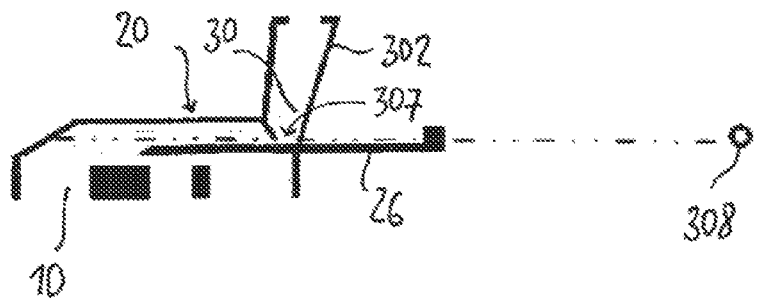

FIGS. 5*a*) to 5*e*) depict different method steps. In FIG. 5*a*), reservoir container 20 is in its waiting position, from which it is brought into its application position above an already existing layer 18. Separating element 26 is then removed, with the result that the bottom of reservoir container 20 opens and build material is applied from the reservoir container onto the already existing layer 18, as depicted in FIG. 5*b*). After separating element 26 has been completely pulled out (see FIG. 5*c*)), it is moved back into its initial position, with the result that reservoir container 20 becomes closed again. The result is that the "thickly" applied new layer is cut through, while layer 50, which is then to be solidified, remains below the separating element. This procedure is illustrated in FIG. 5*d*). The inhomogeneous lifting of reservoir container 20 away from layer 50 then occurs as depicted in FIG. 5*e*), followed by the movement of reservoir container 20 back into the waiting position.

As illustrated in FIG. 5, equalization opening 302 is embodied as a funnel, extending over the entire width of reservoir container 20, that is provided in container cover 303 above side wall 22 of reservoir container 20. Funnel 302 possesses a sufficient height and comprises a constriction 307 through which only a small quantity of build material 30 can slosh back when reservoir container 20 decelerates upon reaching the waiting position. Advantageously, funnel 302 is embodied in such a way that it can serve for simple and rapid refilling of build material 30. Filling preferably occurs when reservoir container 20 is located in the waiting position. Simple and rapid filling of reservoir container 20 is advantageous because reservoir container 20 can be made comparatively small when it needs contain only build material 30 for a small number of layers 30. A reservoir container 20 of such small configuration is notable for a particularly low mass, and for that reason can be moved back and forth particularly simply and rapidly.

Rotation point 308 for the tilting movement of reservoir container 20 is advantageously located in the region of the waiting position of reservoir container 20. Preferably, both the displacement of reservoir container 20 between the application and waiting positions, and the displacement of separating element 26 in order to open and close reservoir container 20, as well as the tilting and the raising and lowering of reservoir container 20, are brought about using only a single drive system, which is not illustrated in the Figures. At the same time, pressing of layer 50 to be solidified, by means of underside 300 of reservoir container 20, can thus be accomplished in particularly simple fashion before reservoir container 20 executes a horizontal movement into its waiting position.

Figure 5E:
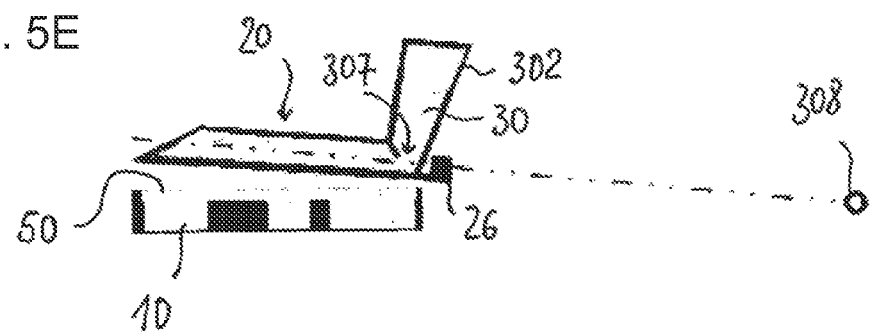

In an embodiment of the invention as depicted in FIG. 5*e*), equalization opening 302 in the funnel can be closed off after pressure equalization is complete.

In a further embodiment of the invention, the method proceeds in a vacuum. In other words, the entire process space is under vacuum. Depiction of the process space has been dispensed with for reasons of clarity, as has the depiction of corresponding pumps, etc. and the depiction of sealing elements for sealing the gap, necessary for the displacement of separating element 26, between separating element 26 and reservoir container 20.

All features presented in the description and the claims below, and depicted in the drawings, may be essential to the invention both individually and in any combination.

The invention claimed is:

1. A method for manufacturing a three-dimensional object by selective solidification of a build material applied in layers, which comprises the steps of:

applying, via an application device, the build material onto one of a substrate or an already solidified layer of the object to be manufactured, the application device including a movably mounted reservoir container for receiving the build material, the reservoir container being, for application of a layer, transferred from a waiting position into an application position and, before solidification of the layer, from the application position back into the waiting position, the reservoir container having a separating element mounted movably, including shiftably, with respect to container walls of the application device and in the application position extends substantially parallel to the layer to be generated, displacement of the separating element causes a part of the reservoir container, the reservoir container being disposed in the application position, first to be opened for an application of the build material and then to be closed again for manufacture of the layer to be solidified, by partial removal of an applied, not yet solidified build material, the reservoir container being completely closed after the separating element has caused the part of the reservoir container to be closed again;

lifting of the reservoir container away from the layer to be solidified during a transfer of the reservoir container from the application position into the waiting position; and lowering of the reservoir container during a transfer of the reservoir container from the waiting position into the application position.

2. The method according to claim 1, which further comprises:

performing at least one of:

modifying a spacing between an underside of the reservoir container on the one hand and the layer to be solidified on the other hand at at least one point, during transfer of the reservoir container from the application position into the waiting position, including prior to a horizontal displacement of the reservoir container into the waiting position, in such a way that the underside of the reservoir container is disposed in non-parallel fashion with respect to the layer to be solidified; or modifying the spacing between the underside of the reservoir container on the one hand and the already solidified layer on the other hand, during transfer of the reservoir container from the waiting position into the application position, including subsequently to the horizontal displacement of the reservoir container out of the waiting position, in such a way that the underside of the reservoir container is disposed substantially parallel to the solidified layer.

\* \* \* \* \*

UNITED STATES PATENT AND TRADEMARK OFFICE
CERTIFICATE OF CORRECTION

PATENT NO. : 8,956,692 B2  
APPLICATION NO. : 13/508679  
DATED : February 17, 2015  
INVENTOR(S) : Carl Fruth Page 1 of 1

It is certified that error appears in the above-identified patent and that said Letters Patent is hereby corrected as shown below:

Title page  
Assignee should read:  
-- (73)   Assignee: FIT AG, Lupburg (DE) --.

Signed and Sealed this  
Eighth Day of December, 2015

Michelle K. Lee  
*Director of the United States Patent and Trademark Office*